(12) United States Patent
Bhat et al.

(10) Patent No.: US 10,044,614 B2
(45) Date of Patent: Aug. 7, 2018

(54) SYSTEM AND METHOD FOR DYNAMIC AND CONFIGURABLE L2/L3 DATA—PLANE IN FPGA

(71) Applicant: TEJAS NETWORKS LIMITED, Bangalore (IN)

(72) Inventors: Vinayak Bhat, Bangalore (IN); Likhit Kulkarni, Bangalore (IN); Anuj Kumar Srivastava, Bangalore (IN); Sachin Kashyap, Bangalore (IN); Abhijit Das, Bangalore (IN); Ravishankar Kumaraswamy, Bangalore (IN)

(73) Assignee: TEJAS NETWORKS LIMITED, Karnataka (IN)

( * ) Notice: Subject to any disclaimer, the term of this patent is extended or adjusted under 35 U.S.C. 154(b) by 440 days.

(21) Appl. No.: 14/670,384

(22) Filed: Mar. 26, 2015

(65) Prior Publication Data

US 2015/0281131 A1 Oct. 1, 2015

(30) Foreign Application Priority Data

Mar. 28, 2014 (IN) .......................... 1654/CHE/2014

(51) Int. Cl.
*H04L 12/741* (2013.01)
*H04L 12/723* (2013.01)

(52) U.S. Cl.
CPC ............ *H04L 45/745* (2013.01); *H04L 45/50* (2013.01)

(58) Field of Classification Search
CPC .............................. H04L 45/745; H04L 45/50
See application file for complete search history.

(56) References Cited

U.S. PATENT DOCUMENTS

| | | | | |
|---|---|---|---|---|
| 7,782,853 B2* | 8/2010 | Huang | ............... | H04L 45/54 370/389 |
| 2004/0165598 A1* | 8/2004 | Shrimali | ............... | H04L 49/254 370/395.42 |
| 2006/0114906 A1* | 6/2006 | Bowes | ............... | H04L 49/3072 370/392 |
| 2007/0195761 A1* | 8/2007 | Tatar | ............... | H04L 49/1546 370/389 |
| 2012/0047260 A1* | 2/2012 | Patel | ............... | H04L 49/9057 709/225 |

(Continued)

*Primary Examiner* — Benjamin H Elliott, IV
*Assistant Examiner* — Brian P Cox
(74) *Attorney, Agent, or Firm* — Barry Choobin; Patent 360 LLC

(57) ABSTRACT

A system and method for providing multi-processor data plane architecture have been provided. The method comprises selecting several processing units for performing an egress data process and an ingress data process. A number of processing units are selected for performing an egress data process based on a type of switch and data rate. Several processing pipes are provided for each processing unit. Each processing pipe is divided into several processing stages based on a number of lookup tables used in the egress data process and the ingress data process to absorb a response time of a memory device. The data is stored in several databases in each processing unit, and the databases are copied into several banks to increase an access time with a storage device, such as DDR-SDRAM. Several headers are resynchronized using a fixed delay time through an ACL unit.

3 Claims, 4 Drawing Sheets

(56) References Cited

U.S. PATENT DOCUMENTS

2012/0257506 A1* 10/2012 Bazlamacci ............ H04L 45/00
                                                        370/235
2014/0006822 A1*  1/2014 Diab .................... G06F 1/3206
                                                        713/322
2014/0156941 A1*  6/2014 Loh ..................... G06F 12/0895
                                                        711/133

* cited by examiner

SYSTEM AND METHOD FOR DYNAMIC AND CONFIGURABLE L2/L3 DATA—PLANE IN FPGA

CROSS REFERENCE TO RELATED APPLICATIONS

This patent application claims the priority of the Indian Provisional Patent Application No. 1654/CHE/2014 filed on Mar. 28, 2014, having the title "A SYSTEM AND METHOD FOR DYNAMIC AND CONFIGURABLE L2/L3 DATA—PLANE IN FPGA", and the content of which is incorporated herein by reference in its entirely.

BACKGROUND

Technical Field

The embodiments herein generally relates to data plane architecture. The embodiments herein particularly relates to Ethernet data plane architecture for switching and routing, which scales across multiple design requirements of a communication network. The embodiments herein more particularly relates to dynamic data plane architecture for implementation of Metro Ethernet Forum [MEF] switches, MPLS-TP and router design on FPGA platform.

Description of Related Art

A data plane is a part of switch/router architecture which supports the virtual switching or routing needs. Based on the needs of a particular customer, the switch employed in the data plane must be able to support the speeds ranging from 5G to 100G speed [or more]. The switches must also be able to support the speeds of the various ports and configurations which are in the range of 2 Mbps [TDM emulation over Ethernet] to 10 Gbps and at times more. The port interface must further support Ethernet at 10/100/1000 and 10G, multiport EoS interface and Modem interface. The hardware cost is low for an aggregate switch capacity of 5 Gbps, while an expensive and large FPGA is required for 100 Gbps switch. For example, the data bus width shall be 1024 bits at a clock rate of 156 MHz or 512 bits at an operating frequency of 250 MHz to design a switch data plane which supports 100 Gbps. It is very difficult to meet the timings in FPGA at 250 MHz, especially when the utilization crosses 70%, while it is easy and simple to proceed with the 1024 bit data bus. However, a routing of 1024 line logic needs an expensive FPGA. Also the bus is inefficient to handle different frame size bursts. So the cost per port goes multiple times the expected cost per port, if the customer plans to use the same logic for a 16 Gbps switch. At 16 Gbps, bus width shall be 128 bits at clock of 175 MHz. Further, multiple FPGAs are employed for designing a fast switching data plane. In view of foregoing, there is a need for a data plane architecture that scales across the cost and size of the FPGA devices as well as the architecture has to be flexible to scale across multiple FPGAs. The architecture must be adapted to meet the various sizes and speeds without any additional cost at slower speed or compromising the performance at high speed.

The dataplane mainly decides on the routing of incoming packets depending on a lookup table. The router looks up the destination address of the incoming packet and retrieves the information necessary to determine the path from the receiving element, through the internal forwarding switch of the router, and to the proper outgoing interface(s). Metro switch design needs multiple and large lookup tables to store multiple flow points and MAC address database. For storing the lookup tables, the dataplane requires several database accesses of different sizes and interfaces to different port speeds. Normal DDR3 devices are of low in cost but the big delays in random access memory make them unusable. But using any other expensive memory [CAM, QDR SRAM etc] makes the product cost abysmally high. Hence there is a need for a dataplane architecture that adopts different memory types to store the various databases.

The above mentioned shortcomings, disadvantages and problems are addressed herein and which will be understood by reading and studying the following specification.

OBJECTIVES OF THE EMBODIMENTS

The primary object of the embodiments herein is to provide a system and method for generating and managing dynamic dataplane for MEF switches, MPLS-TP router in FPGA platform, Another object of the embodiments herein is to provide a flexible dataplane architecture that scales across the various ranges of sizes and speeds of a FPGA.

Yet another object of the embodiments herein is to provide a multi-processing pipe architecture that scales across the multiple FPGAs to provide a fast switching dataplane.

Yet another object of the embodiments herein is to provide a dataplane architecture that adopts over different memory types in order to store the multiple lookup tables and databases.

These and other objects and advantages of the embodiments herein will become readily apparent from the following detailed description taken in conjunction with the accompanying drawings.

SUMMARY

The embodiments herein provide a system and method for providing multi-processing dataplane architecture. The dataplane architecture is flexible across multiple FPGA architectures and the architecture seamlessly adapts to the size and speed without adding to the cost at slower speed or performance at high speed. The method for generating and managing a dynamic data plane for MEF switches, MPLS-TP router in FPGA platform comprises the steps of selecting a plurality of processing units for performing an egress data process and an ingress data process. A number of processing units is selected for performing an egress data process based on a type of switch and data rate. A plurality of processing pipes is provided for each processing unit. Each processing pipe is divided into a plurality of processing stages to absorb a response time of a memory device. Each processing pipe is divided into the plurality of processing stages based on a number of lookup tables used in the egress data process and the ingress data process. A plurality of data is stored in a plurality of databases provided in each processing unit, and the plurality of databases is copied into a plurality of banks to increase an access time with a storage device, which is DDR-SDRAM. A plurality of headers is resynchronized using a fixed delay time through an ACL unit.

The embodiments herein provide a method for an ingress data processing. The method comprises the steps of assigning a plurality of ports to each processing unit by an ingress arbiter switch matrix. A stored data is split across a plurality of processing pipes using a weighted round robin [WRR] block to reduce a processing load of each processing unit. A sequence number and a time stamp are attached each data frame. A data is copied into a temporary buffer and the temporary buffer is an ingress data buffer. The ingress data buffer is a slotted memory with buffers having a size of 128/256 bytes. A header of preset size is copied to each processing pipe as header queue. The headers are processed in the plurality of processing stages after a completion of the full header and a final processing stage is started after an elapse of an fixed delay to ensure that a processing of data and frames in all the processing stages are completed in a preset interval of time. A statistics block is updated for a frame information and a policer is updated for remaining credit.

According to one embodiment herein, the method for the ingress data processing further comprises following steps of extracting all header data in a first stage of processing. A frame processing is completed in a preset interval of time. A plurality of look-up tables is generated in the first processing stage. The plurality of look-up table includes a first table for admission and handling of port database, a FPCR look-up table for a virtual database, and an ACL table. The FPCR details are collected from DDR in the second processing stage to perform FDB, tunnel lookups and learning validation. A metadata header is created based on all look-up tables and the created metadata is forwarded to IDB for forwarding a frame along with a header to a traffic manager.

The various embodiments herein provide a method for an egress data processing. The method comprises the following steps of forwarding a frame received from the traffic manger to individual egress data buffers (EDB), and wherein EDB is arranged for each processing unit in egress process. A meta-data header is copied separately to a control buffer. A memory request is generated for a frame processing. The frame is processed in a freely available processing unit after receiving a response for the generated memory request. The processed frame is forwarded to the individual ports after performing all the checks. The data is resynchronized and wherein the data is resynchronized in a plurality of ports, when a speed of port is more than 10G.

The various embodiments herein provide a system for generating and managing a dynamic data plane for ingress processing in switches, MPLS-TP router in FPGA platform. The system comprises an ingress arbiter, a plurality of databases, a plurality of ingress processing units and a traffic manager interface. The ingress processing unit further comprises a header queue, an ingress data buffer, a logic unit, a plurality of processing pipes.

According to one embodiment herein, the logic unit of the ingress processing unit comprises an address learning and ageing module, database multi-copy logic module, memory controller, a flow statistics module, BRAM based database tables, ACL block, memory arbiter, and policing and statistics module.

According to one embodiment herein, the ingress data processing unit extracts all header data in a first stage of processing, and wherein a frame processing is completed in a preset interval of time. A plurality of look-up tables is generated in the first processing stage. The plurality of look-up table includes a first table for port database for performing admission and handling, a FPCR look-up table for a virtual database, and an ACL table. The ingress data processing unit collects FPCR details from DDR in the second processing stage to perform FDB, tunnel lookups and learning validation. The ingress data processing unit creates a meta data header based on all look-up tables and forwards the created metadata to IDB for forwarding a frame along with a header to a traffic manager.

The various embodiments herein provide a system for generating and managing dynamic data plane for egress processing in switches, MPLS-TP router in FPGA platform. The system comprises a database table, a memory controller, a statistics interface, a plurality of egress processing units and a traffic manager interface.

According to one embodiment herein, the egress processing unit comprises a first buffer interface, a second buffer interface, data combining/merging module, an egress checking module, a plurality of header modification modules, a memory request queue, a plurality of processing pipes, and egress data buffer.

According to one embodiment herein, the egress processing unit forwards a frame received from the traffic manger to the individual egress data buffers (EDB). The egress processing unit copies the metadata separately to a control buffer. The egress processing unit generates a memory request for a frame processing. The egress processing unit processes the frame when the processing unit is freely available for a processing operation after receiving a response for the generated memory request. The egress processing unit forwards the processed frame to the individual ports after a completion of all the checks. The egress processing unit resynchronizes a data in a plurality of ports, when a speed of port is more than 10G.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
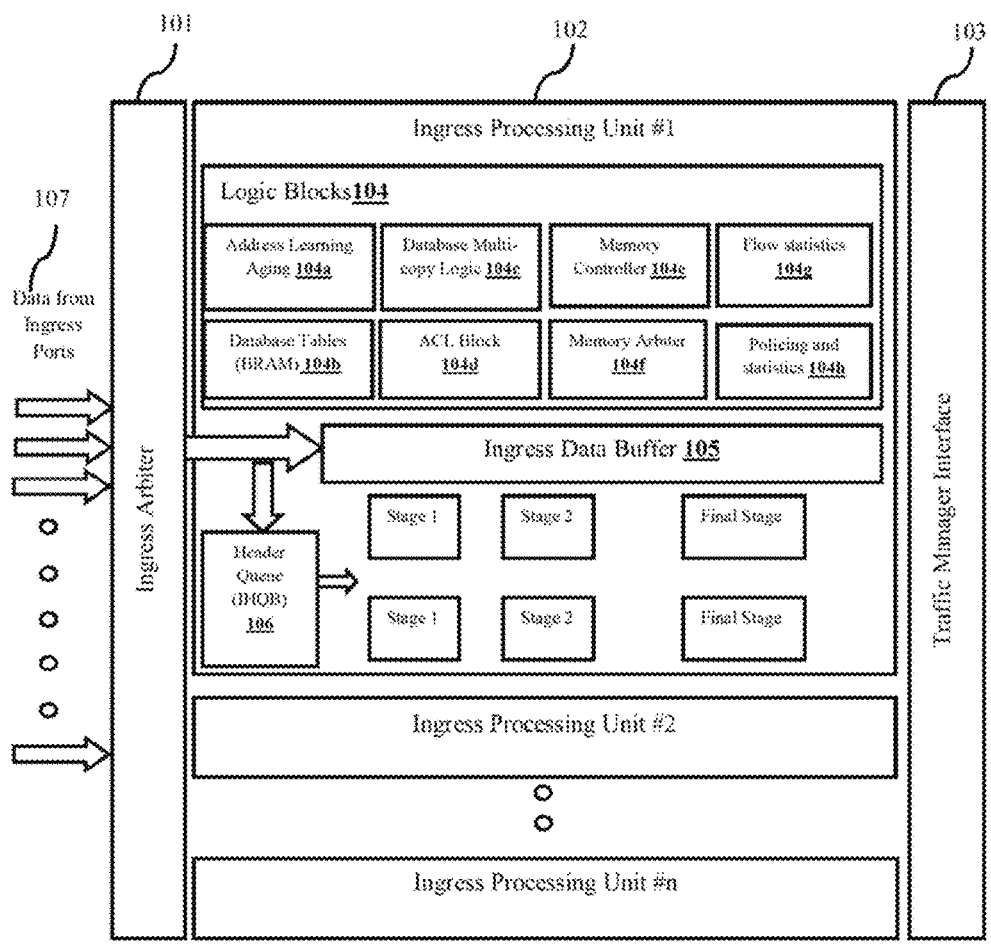
FIG. 1 illustrates a block diagram of a system for ingress data processing of incoming data packets, according to one embodiment herein.

Although the specific features of the embodiments herein are shown in some drawings and not in others. This is d for convenience only as each feature may be combined with any or all of the other features in accordance with the embodiments herein.

DETAILED DESCRIPTION OF THE EMBODIMENTS

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a multi-processor architecture for a dataplane. The dataplane architecture is flexible across multiple FPGA architectures and the architecture seamlessly adapts to the sizes and speeds of multiple ports without adding to the cost for ports of lower speed or performance for ports of at high speed. The dataplane architecture comprises a plurality of processing units for performing an egress data process and an ingress data process. The plurality of processing units is configured for performing the egress data process and the ingress data process based on a type of switch and data rate of incoming data steam. Each data processing unit comprises a plurality of processing pipes and each processing pipe is further divided into a plurality of processing stages. The processing unit is divided into multiple processing stages based on a number of lookup tables used in the egress data process and the ingress data process. The processing unit further comprises a memory device. The memory device of the processing unit is configured for storing a plurality of databases and lookup tables. The memory device is any one of a Double Data Rate (DDR)—Synchronous Dynamic Random Access Memory (SDRAM), for example, DDR2 SDRAM, DDR3 SDRAM and the like. The lookup tables comprise information corresponding to various routing tables, Ethernet flow point addresses and MAC addresses. The storage area of the memory device is divided into several banks thereby allowing the chip to work on several memory access commands at a time. The databases and lookup tables are copied into multiple banks, in-order to increase the access time with DDR-SDRAM. Other databases like Virtual Output Queue (VoQ) lookup, Virtual Local Area Network (VLAN) subscription, Port database, Policing, Protection, LAG, and Tunnel protocol and the like are stored in a block RAM. The processing stages facilitate the processing unit to absorb relatively high response time of the memory device.

According to one embodiment herein, the dataplane switch is configured to use a single processing unit which is operating at a frequency of 125 MHz for obtaining a speed of up to 8 Gbps., The single processing unit is configured to operate at 200 MHz frequency for obtaining a speed of up to 12G. At least two processing units are employed, for configuring a speed of up to 24 Gbps. At least three processing units are employed to obtain a speed of 36G. Similarly at least 8 processing units are employed for 100G switch.

According to one embodiment herein, the datapath width at the processing unit level is typically 64 bits and the width is typically 32 bits at the processing pipe level in the ingress data processing stage. As VLAN, IP and TCP headers are aligned with 32 bit; the bus width is limited to 32 bits. Further, the bus width is 32 bit at processing unit level in egress processing stage.

According to one embodiment herein, the headers of each incoming data packet are resynchronized at the rate of a fixed delay through ACL section. The fixed delay is calculated as a sum of maximum delays of all database accesses and a margin time. The fixed delay is typically around 400 clocks at a frequency of 200 MHz, whereas the delay is less for 125 MHz operating frequency. The resynchronization of packet headers assists in re-ordering of the data packets according to the incoming order of data packets.

According to one embodiment herein, the dataplane architecture comprises an ingress data processing system and an egress data processing system.

FIG. 1 illustrates a block diagram of a system for ingress data processing of incoming data packets, according to one embodiment herein. The ingress data processing module comprises an ingress arbiter 101, a plurality of databases, a plurality of ingress processing units 102, a traffic manager interface 103 and a plurality of ingress ports 107. The plurality of ingress processing units 102 further comprises an ingress header queue buffer 106, an ingress data buffer 105, a logic unit 104 and a plurality of processing pipes. The ingress arbiter 101 is configured to allocate a set of ingress ports 107 to each processing unit 102. When the speed of port is greater than a pre-determined threshold, the incoming data packets are directed to multiple pipes. The data packets are split across multiple pipes according to a Weighted Round Robin (WRR) algorithm. At WRR block, a sequence number and a time stamp is attached with each data packet. The sequence number of each data packet identifies the incoming order of the respective data packet. The assignment of sequence number is irrespective of the port speed. The inclusion of the time stamp assists in IEEE1588 handling for synchronizing clocks throughout the dataplane. The splitting up of the data packets is carried out to maintain the port speed per processing unit at a level which is lower than a predetermined reference, for example, the speed must be at least 12.5 Gbps at 200 MHz or less than 6.5 Gbps at 125 MHz. The port speed is typically a product of processing clock speed. The actual port clocks are not brought to processing level.

According to one embodiment herein, the ingress data buffer 105 is configured to store the data from incoming data packets. The ingress data buffer 105 is typically a temporary buffer comprising a plurality of memory slots, where each memory slot is of fixed size. The incoming data packets are received at various ports of the ingress arbiter 101. Depending on the speed of incoming data packets, the ingress arbiter directs the incoming data packets to multiple ingress processing units 102. The received data packets at each ingress processing unit 102 undergo processing at various stages. At initial stage, the data from the incoming data packets is stored in the ingress data buffer 105, whereas the header content of each data packet is extracted and copied to an Ingress I-leader Queue Buffer 106. The processing of each data packet is completed within a fixed clock cycles. The ingress processing unit 102 further generates at least three lookup tables. The various lookup tables comprise a port database lookup table, a Flow-Point Classification Rule (FPCR) lookup table, and an Access Control List (ACL) lookup table. The lookup table holding port database mainly supports information pertaining to admission of the ingress ports and handling of the data received on the ingress ports. The FPCR table provides a lookup for a virtual database. The ACL lookup table contains rules that are applied to port numbers or IP Addresses that are available on the ingress arbiter. Based on admission rules from the port database, a few non-matching data packets are marked as dropped packets, even though these packets are passed through the processing pipes to keep the distance same. The second processing stage collects FPCR details from the memory device to construct Forward DataBase (FDB), Tunnel lookup tables and learning validation. In the final processing stage, a metadata header is created based on the lookup tables of the plurality of databases. The created metadata header is forwarded to ingress data buffer 105, which in turn forwards the data packets along with the metadata headers to the traffic manager 106.

According to one embodiment herein, the logic unit 104 of the ingress processing unit comprises an address learning and ageing module 104a, a database multi-copy logic module 104c, a memory controller 104e, a flow statistics module 104g, a BRAM based database tables 104b, an ACL block 104d, a memory arbiter 104f, and a policing and statistics module 104h. The logic unit 104 is common across all the ingress processing units 102. As the data packets are forwarded to traffic manager interface 106, the flow statistics module 104g and the policing and statistics module 104h are updated with the information pertaining to data packets, where the information is related to both the ports and flow points/passing nodes. The policing and statistics module 104h is also updated with the remaining credits.

Figure 2:
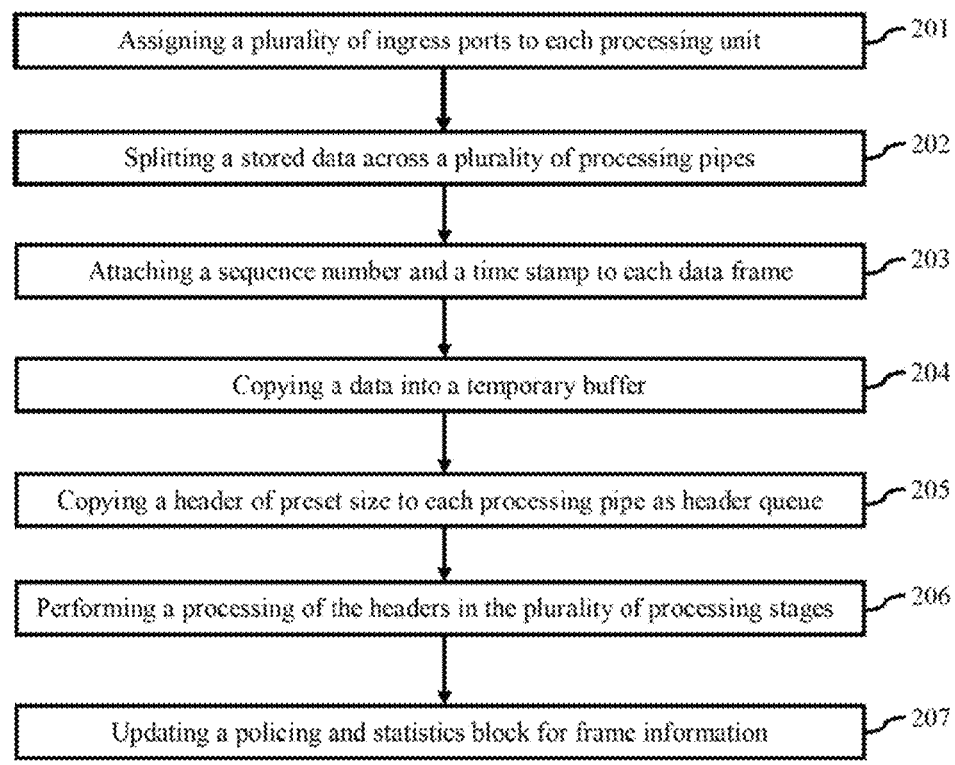
FIG. 2 is a flowchart illustrating the steps involved in a method for ingress data processing of incoming data packets, according to one embodiment herein.

FIG. 2 illustrates a flowchart explaining the steps involved in a method for the ingress data processing of incoming data packets, according to one embodiment herein. The method comprises the following steps of assigning a plurality of ingress ports to each processing unit by an ingress arbiter switch matrix (201). A stored data is split across a plurality of processing pipes using a WRR block to reduce a processing load of each processing unit (202). A sequence number and a time stamp is attached to each data frame (203). A data is copied into a temporary buffer (204). The temporary buffer is an ingress data buffer. The ingress data buffer is a slotted memory with buffers having a fixed size of, for example, 128/256 bytes. A header of preset size is copied to each processing pipe as header queue (205). The headers are processed after a completion of the full header in the plurality of processing stages (206). A final processing stage is started after an elapse of an ACL delay to ensure that a processing of data and frames in all the processing stages are completed in a preset interval of time. A statistics block is updated with frame information and a policy block is updated with the remaining credits (207).

Figure 3:
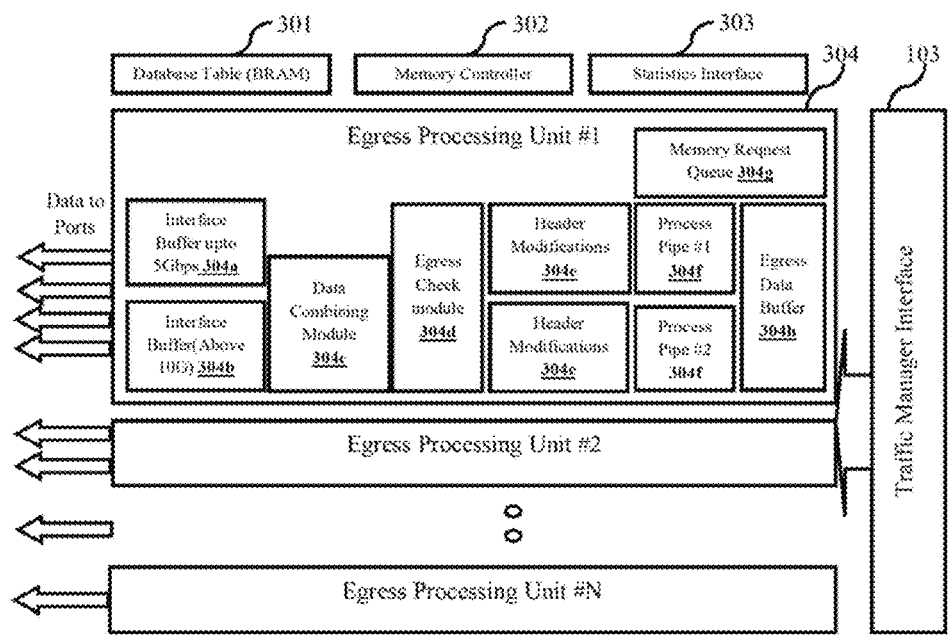
FIG. 3 illustrates a block diagram of a system illustrating egress data processing of frames received from the ingress data processing system through a traffic manager, buffer manager block, according to one embodiment herein.

FIG. 3 illustrates a block diagram of a system for egress data processing of the data packets received from the ingress data processing system, according to one embodiment herein. The egress data processing system comprises a database table 301, a memory controller 302, a statistics interface 303, a plurality of egress processing units 304 and a traffic manager interface 103. The egress processing unit 304 further comprises a first buffer interface 304a, a second buffer interface 304b, data combining module 304c, an egress checking module 304d, a plurality of header modification modules 304e, a memory request queue 304g, a plurality of processing pipes 304f, and egress data buffer 304h. The data packets along with their respective metadata headers are received from the ingress data processing system through the traffic manager interface 103. The received data packets are forwarded to egress data buffers (EDB) 304h of individual egress processing unit. The egress processing unit 304 separately stores the metadata header into the control buffer 304h and a memory request is published at the memory request queue 304g for initiating a data packet processing operation. When a response for the memory request is received, the plurality of processing pipes 304f, which are freely available, process the data packets. The processed data packets are further forwarded to the individual output ports after undergoing various error verification processes. Since each processing pipe 304f process a single data packet, the data packets needs to resynchronized before transmitting the data packets. The data packets are resynchronized based on the sequence number that is associated with each data packet to reorder the outgoing data packets. The data packets are resynchronized when the speed of the port is more than a predefined threshold value, for example 100 Gbps.

Figure 4:
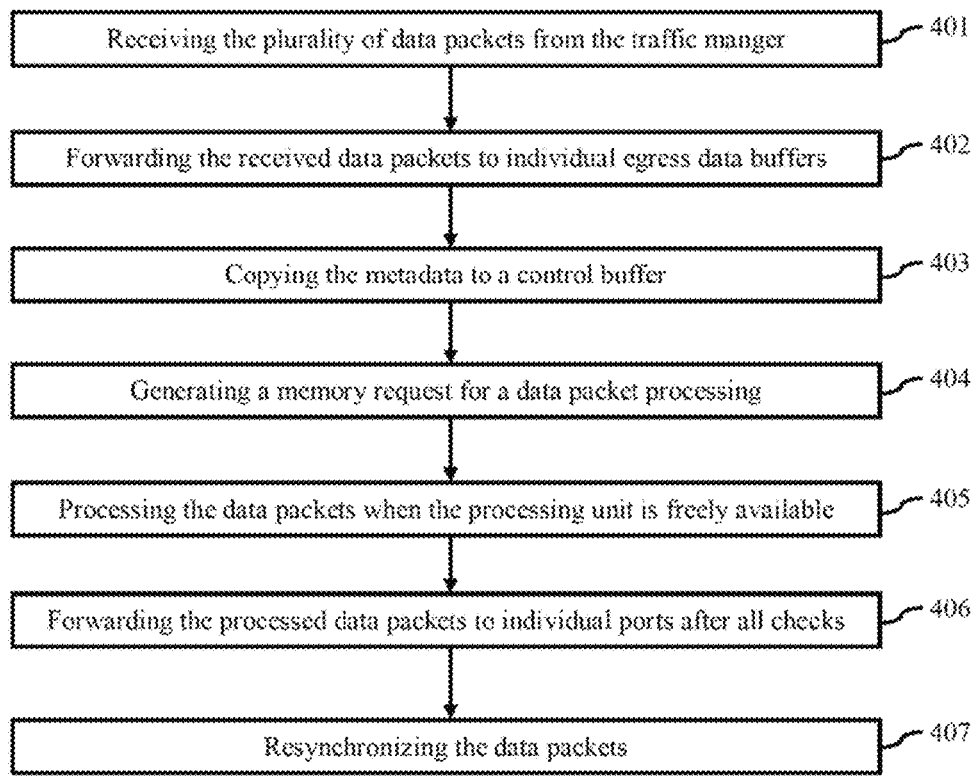
FIG. 4 is a flowchart illustrating the steps involved in a method for egress data processing of the data packets received from the ingress data processing system, according to one embodiment herein.

FIG. 4 illustrates a flowchart explaining a method of egress data processing of the data packets received from the ingress data processing system, according to one embodiment herein. The method comprises following steps of receiving the plurality of data packets from the traffic manager (401). The received data packets are forwarded to the individual egress data buffers (EDB) (402). The metadata is copied to a control buffer by the egress processing unit (403). A memory request for a data packet processing is generated by the egress processing unit (404). The data packets are processed in the processing units that are freely available, after receiving a response for the generated memory request (405). The processed data packets is forwarding to individual ports after completing all the checks (406). The data packets are resynchronized according to the sequence number of the data packets, when the port speed is more than a predefined threshold value, for example 10G (407).

The various embodiments herein provide a multi-processor architecture for a dataplane. The dataplane architecture is flexible across multiple FPGA architectures and the architecture seamlessly adapts to the sizes and speeds of multiple ports without adding to the cost for ports of lower speed or performance for ports of at high speed.

The embodiments herein provides a multi-processor architecture for a dataplane, which scales across the multiple requirements. It is operated across 5 Gbps to 50 Gbps rates as well as three different platforms with different FPGA devices and size. Logic is fully tested for 802.1Q; 802.1ad based switching per MEF standards and MPLS-TP standard as per IETF. This design is verified in 5 different switch designs such as 5G, 6G tested over Lattice ECP3-150 FPGA, 16 Gbps on Xilinx Kintex7 FPGA and 36G/48G tested over HXT devices. As the base code is same across all, updates are extremely simple to handle and tests are only incremental.

The foregoing description of the specific embodiments herein will so fully reveal the general nature of the embodiments herein that others can, by applying current knowledge, readily modify and/or adapt for various applications such specific embodiments herein without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

Although the embodiments herein are described with various specific implementations, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method for generating and managing dynamic data plane for MEF switches, MPLS-TP router in FPGA platform, the method comprises steps of:
- selecting a plurality of processing units for performing an ingress data process and an egress data process, and wherein a number of processing units is selected for performing an ingress data process and an egress data process is based on a type of switch and data rate;
- providing a plurality of processing pipes for each processing unit, and causing at least some of said plurality of processing units to perform said ingress data process by:
  - extracting all header data in a first stage of processing, and wherein a frame processing is completed in a preset interval of time, and wherein a plurality of look-up tables is generated in the first processing stage, and wherein the plurality of look-up table includes a first table for port database for admission and handling, a Flow-Point Classification Rule (FPCR) look-up table for a virtual database, and an Access Control List (ACL) table;
  - collecting FPCR details from a DDR-SDRAM in the second processing stage to perform Forward Database (FD B) construction, tunnel lookups and learning validation; and
  - creating a meta data header based on all look-up tables and forwarding the created metadata to Ingress Data Buffers (IDB) for forwarding a frame along with a header to a traffic manager;
- dividing each processing pipe into a plurality of processing stages to absorb a response time of a memory, device, and wherein each processing pipe is divided into the plurality of processing stages based on a number of lookup tables used in the ingress data process and the egress data process;
- storing a plurality of data in a plurality of databases provided in each processing unit, and wherein the plurality of databases are copied into a plurality of banks to increase an access time with said DDR-SDRAM; and
- resynchronizing a plurality of headers using a fixed delay time through a lookup unit.

2. The method according to claim 1, wherein an ingress data processing comprises the steps of:
- assigning a plurality of ports to each processing unit by an ingress arbiter switch matrix;
- splitting a stored data across a plurality of processing pipes using a Weighted Round Robin (WRR) block to reduce a processing load of each processing unit;
- attaching a sequence number and a time stamp to each data frame;
- copying a data into a temporary buffer, and wherein the temporary buffer is an ingress data buffer, and wherein the ingress data buffer is a slotted memory with buffers having a size of 128/256 bytes;
- copying a header of preset size to each processing pipe as header queue;
- performing a processing of the headers after a completion of the full header in the plurality of processing stages, and wherein a final processing stage is started after an elapse of an fixed delay to ensure that a processing of data and frames in all the processing stages are completed in a preset interval of time; and
- updating a statistics block for frame information and updating a politer for remaining credit.

3. The method according to claim 1, wherein an egress data processing comprises the steps of:
- forwarding a frame received from a traffic manger to individual egress data buffers (EDB), and wherein EDB is arranged for each processing unit in egress process;
- copying meta data separately to a control buffer;
- generating a memory request for a frame processing;
- processing the frame in a freely available processing unit after receiving a response for the generated memory request;
- forwarding the processed frame to individual ports; and
- performing a resynchronizing operation of a data, and wherein the resynchronization of the data is done in a plurality of ports, when a speed of port is more than 10G.

* * * * *